United States Patent
White et al.

(10) Patent No.: US 12,259,070 B2
(45) Date of Patent: Mar. 25, 2025

(54) CABLE/TUBE SLEEVE AND SNORKEL

(71) Applicant: DEKA Products Limited Partnership, Manchester, NH (US)

(72) Inventors: Matthew White, Henniker, NH (US); Zachary Kops, Andover, MA (US)

(73) Assignee: DEKA Products Limited Partnership, Manchester, NH (US)

( * ) Notice: Subject to any disclaimer, the term of this patent is extended or adjusted under 35 U.S.C. 154(b) by 524 days.

(21) Appl. No.: 17/522,003

(22) Filed: Nov. 9, 2021

(65) Prior Publication Data

US 2022/0154852 A1 May 19, 2022

Related U.S. Application Data

(60) Provisional application No. 63/115,261, filed on Nov. 18, 2020.

(51) Int. Cl.
*F16L 3/01* (2006.01)

(52) U.S. Cl.
CPC ................................ *F16L 3/01* (2013.01)

(58) Field of Classification Search
CPC .......................................................... F16L 3/01
USPC ............................................................ 138/109
See application file for complete search history.

(56) References Cited

U.S. PATENT DOCUMENTS

| | | | |
|---|---|---|---|
| 6,488,511 B1 * | 12/2002 | Stewart ................... | B25F 5/021 30/296.1 |
| 7,183,502 B1 * | 2/2007 | Johnston .............. | H02G 3/0431 174/95 |
| 7,712,710 B2 | 5/2010 | Root | |
| 8,826,939 B2 * | 9/2014 | Damaske ............... | B60R 15/00 137/899 |
| 9,267,623 B2 * | 2/2016 | Druegemoeller .... | A61G 13/107 |
| 10,088,097 B2 * | 10/2018 | Hermey ................. | H02G 3/263 |
| 10,865,556 B2 * | 12/2020 | Wright .................... | E03F 1/008 |
| 2018/0306348 A1 * | 10/2018 | Chan ........................ | F16L 3/01 |

* cited by examiner

*Primary Examiner* — David R Deal
(74) *Attorney, Agent, or Firm* — Mark E. Tetreault

(57) ABSTRACT

A snorkel for guiding cables and tubes of the present teachings can include a base having an entrance and a conduit interface. The entrance can be configured to guide cabling into the conduit interface. The snorkel can include a conduit operably coupled with the base. The conduit can include a cap interface, and the conduit can receive the cabling through the conduit interface. The conduit can be configured to lower and raise within the base. The snorkel can include a cap operably coupled with the conduit. The cap can include a cable exit cavity and a tubing guide ear.

12 Claims, 10 Drawing Sheets

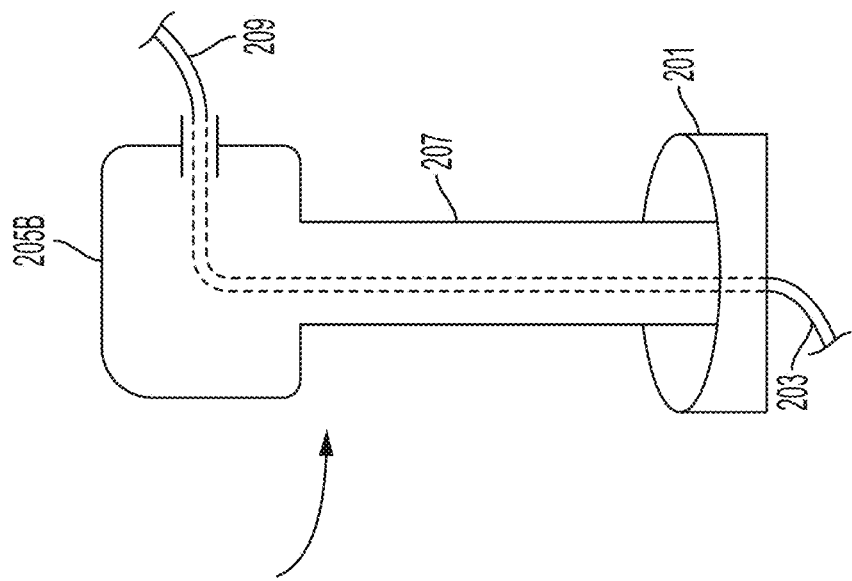
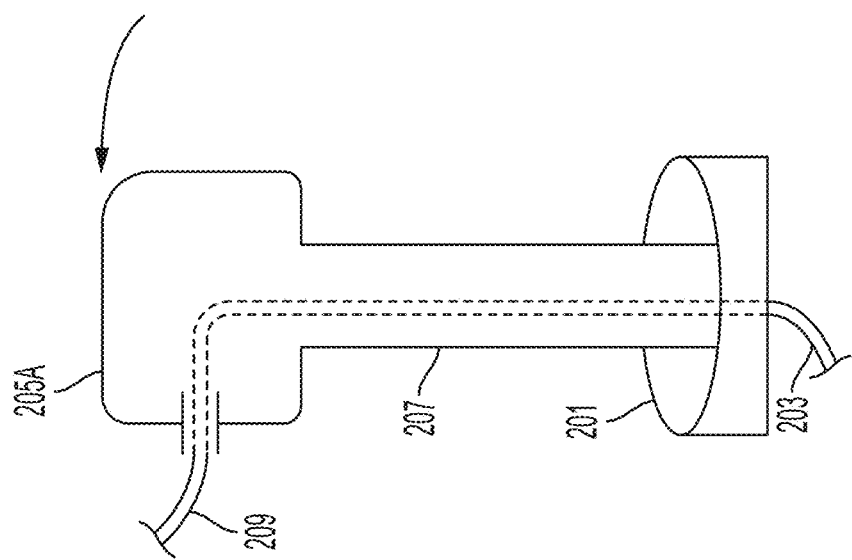

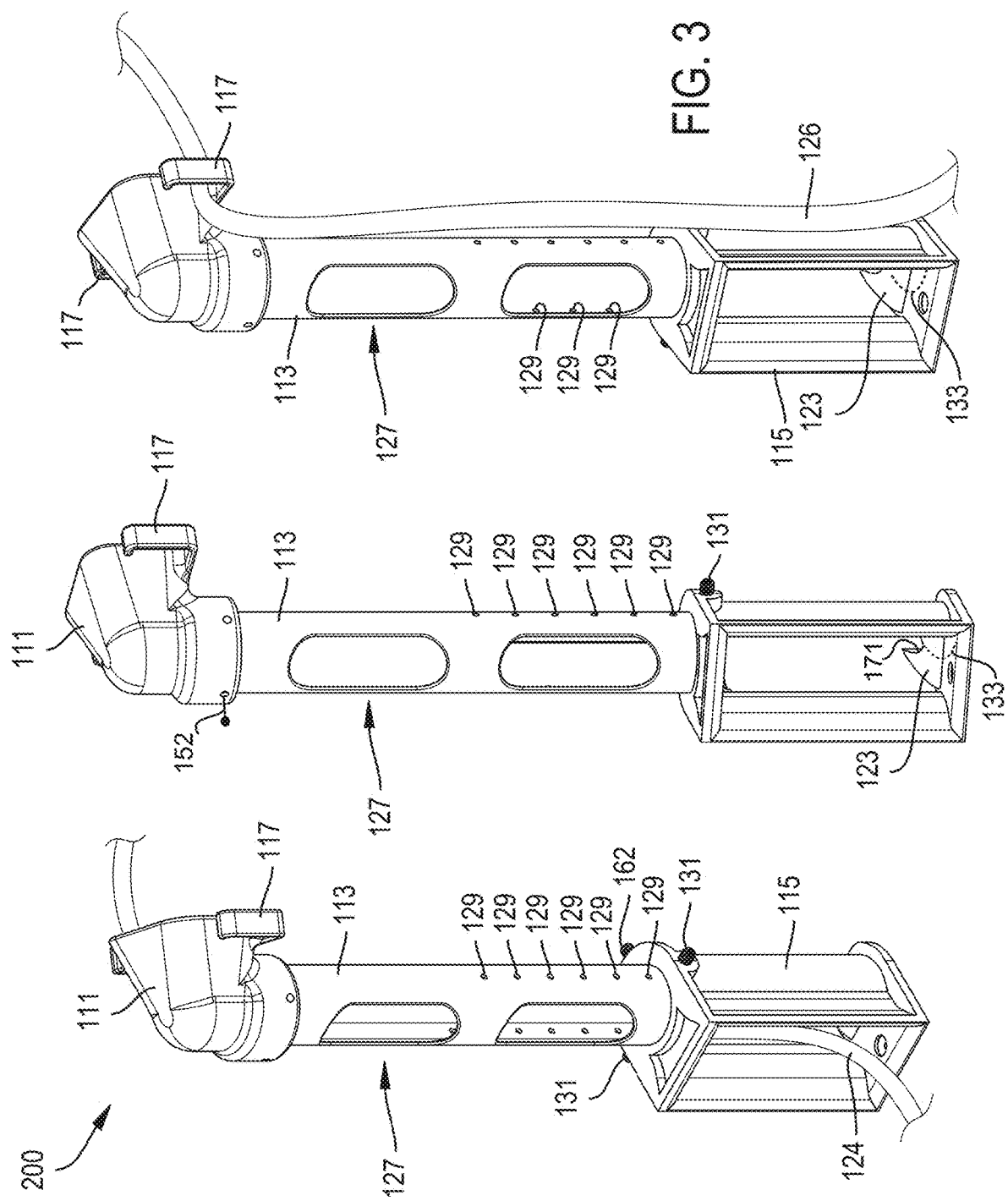

CABLE/TUBE SLEEVE AND SNORKEL

CROSS REFERENCE TO RELATED APPLICATIONS

This application claims the benefit of U.S. Provisional Application Ser. No. 63/115,261, filed Nov. 18, 2020, entitled CABLE/TUBE SLEEVE AND SNORKEL, which is incorporated herein by reference in its entirety.

BACKGROUND

The present disclosure pertains to configurable systems, and specifically to configurable manufacturing systems including wiring and tubing. In configurable systems, the idea is to enable plug and play components to be added to and removed from a system with little to no retooling of the system. This is a special concern with respect to accommodating operable coupling of the swappable components whose footprints differ from component type to component type. Depending upon the requirements of the component, operable coupling can take the form of, for example, but not limited to, power and data cabling, and/or fluid tubing, and/or gas tubing. In configurations in which space is at a premium, compact treatment of cabling and tubing is required.

Rigid cable and tubing feeding sheaves are typically formed to accommodate one size of cabling or tubing, for example, the COMSTAR SUPPLY® cable feeding sheave SKU CDX08617215. This particular sheave guides 1.5 inch cable. Other cable sizes require other sheaves. Likewise, under desk cable organizers and J-channel cable raceways such as the ARACARI® desk/table tray or YECAYE® desk cord cable organizer and other similar products attach to a surface such as a desk and have no flexibility after mounting is complete. Cable holders have similar limitations.

Non-rigid cable conduits such as KABLE KONTROL® VORTEX® spiral wrap tubing or JOTO® cable management sleeve can accommodate specific inside cable diameters, but doesn't have the structural integrity to retain tubing and cables in a pre-selected shape. Other types of cable guides such as on-wall cord covers, cable ties, and cable clips have similar limitations. A cable management box is inflexibly shaped, sometimes taking up more room than necessary, other times not large enough to accommodate a desired number of cables.

SUMMARY

The cable/tube sleeve and snorkel of the present teachings can accommodate reconfigurations of a system to easily change the size of a component required for a process without altering other parts of the system. The snorkel for guiding cables and tubes of the present teachings can include, but is not limited to including, a base having an entrance and a conduit interface. The entrance can be configured to guide cabling into the conduit interface. The snorkel can include a conduit operably coupled with the base. The conduit can include a cap interface, and the conduit can receive the cabling through the conduit interface. The conduit can be configured to lower and raise within the base. The snorkel can include a cap operably coupled with the conduit. The cap can include a cable exit cavity and at least one tubing guide ear. The cap can receive the cabling through the cap interface, and can be configured to guide the cabling through the cable exit cavity. The at least one tubing guide ear can be configured to guide tubing alongside the cable exit cavity.

The base can optionally include a cable ramp configured to accommodate a cable bend radius of the cabling. As cables and tubes enter the base and travel into the conduit, geometric adjustment by flexible cables/tubes will occur. The cable ramp can encourage a gradual change from, for example, a horizontal orientation of the cable/tubing to a vertical orientation to avoid kinking of flexible cable/tubing. The ramp can optionally include at least one detent to accommodate attaching the snorkel base to a mounting surface. The detent(s) can further avoid kinking of the cable(s)/tubing. Other anti-kink geometries are contemplated by the present teachings.

The conduit can optionally include multiple parts that can telescope the cap to a desired height. Adjustable height means can include, but are not limited to including, fixed detents with spring/ball plungers, tightening means such as threaded collar(s), threaded adjusting knob(s), shafts threaded relative to each other, and/or pivoting clamping lever(s). The threaded collar(s), threaded adjusting knob(s), and clamping lever(s) can increase friction between the shafts to disable or severely curtail, vertical and rotational movement. In an exemplary configuration, the base can include at least one base mounting cavity, at least one detent cavity, and at least one alignment cut cavity. The at least one detent cavity can be configured to accommodate a ball plunger. The at least one alignment cut cavity can be configured to accommodate a spring plunger. The at least one detent can be configured to align with the at least one detent cavity. The conduit can further optionally include at least one alignment cut configured to maintain alignment of the at least one detent with the at least one detent cavity. The conduit can optionally include at least one threading cavity configured to enable threading of the cabling/tubing through the conduit. The threading cavity can be shaped to enable manual manipulation of the cables/tubing as they are proceeding through the conduit towards, into, and through the cap. There can be multiple threading cavities, depending upon the length, possibly fully extended, of the conduit. If there are multiple cavities, they can all be the same shape or different shapes.

When the cap and the conduit are separate parts, the cap and conduit can be operably coupled in any conventional way that can also accommodate rotation of the cap. The cap and conduit can also be formed as a single part as long as they are also able to rotate relative to each other. The range of rotation can vary according to the needs of the system. In some configurations, the cap can rotate 360° with respect to the conduit. In other configurations, a rotation angle of 180° or 90° could be sufficient. The cap can be retained at a desired position by, for example, a pin, a lever, or a compression collar. In an exemplary configuration, the cap can optionally include at least one rotation cavity configured to receive a pin. The pin can enter the at least one rotation slit through the at least one rotation cavity. The cap can optionally include at least one tubing guide ear. The tubing guide ear can retain in place tubing and/or cabling outside of the conduit. The ear can accommodate a single tube or multiple tubes, and can be shaped to accept specific sizes of cables/tubes, or any shape. For example, the ear can take on a U-shape, a circle, an open circle, an oval, an open oval, a square, an open square, a rounded rectangle, an open rounded rectangle, a squircle, or an open squircle, among other geometric shapes. An advantage of an open shape is that the tube/cable does not have to be threaded through the shape. In an exemplary configuration, the tubing guide ear can optionally include a first portion operably coupled with the cap. The first portion can extend substantially perpendicular to the cap. The tubing guide ear can include a second portion operably coupled with the first portion, the second portion extending substantially perpendicular to the first portion, and a third portion operably coupled with the second portion, the third portion extending substantially perpendicular to the second portion, the third portion being separated from the cap by a gap.

BRIEF DESCRIPTION OF THE DRAWINGS

The foregoing features of the disclosure will be more readily understood by reference to the following description, taken with reference to the accompanying drawings, in which:

FIGS. 1A-1D are pictorial representations of an exemplary configuration of the snorkel of the present teachings;

FIGS. 3 and 4 present a set of perspective views of various orientations of the snorkel of the present teachings including exemplary tubing and cabling;

DETAILED DESCRIPTION

The cable/tube sleeve and snorkel of the present teachings can be used to organize tubing and wiring. The sleeve/snorkel is appropriate for any size system and configuration, even systems in which space is at a premium. The features of the sleeve/snorkel that enable its ubiquitous use include, but are not limited to, a telescoping means, a rotatable cap, cable/tubing threading cavities, and a geometry that can enable non-kinking cable/tubing bend radius.

Figure 1B:
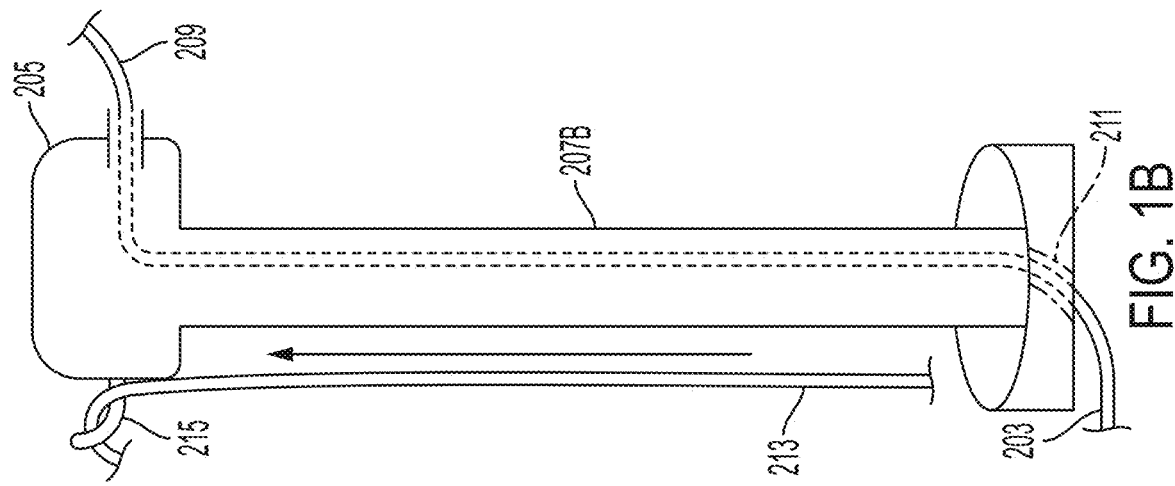
Figure 1A:
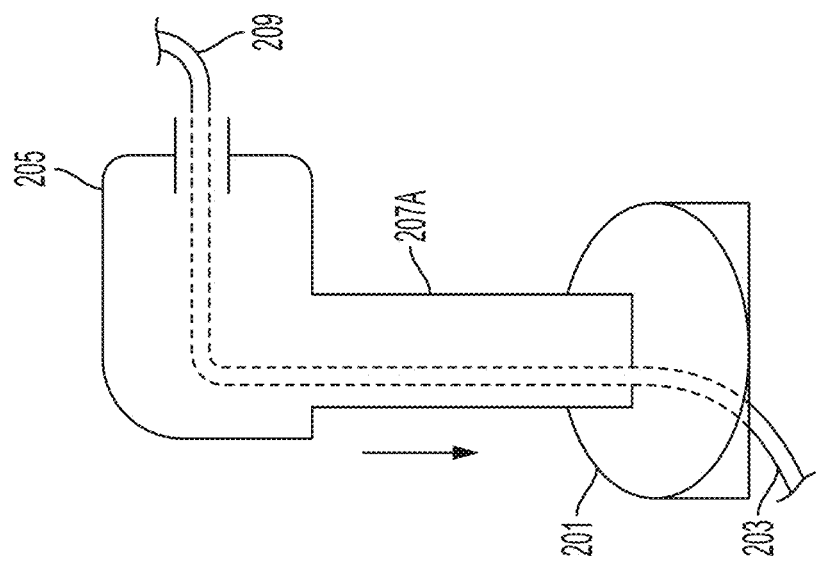

Referring now to FIGS. 1A-1D, adjustable sleeves and snorkels of the present teachings can provide features such as, but not limited to, height adjustment, directional adjustment, tube/cable routing within and outside of a sleeve, and non-kink geometry. Examples of these features are shown in FIGS. 1A-1D. Specifically, FIGS. 1A and 1B illustrate length adjustment of the conduit, and FIGS. 1C and 1D illustrate directional adjustment of the cap. Tubing/cabling 203 (FIG. 1B) can run through base 201, conduit 207A/207B (FIGS. 1A/1B), and finally cap 205. Conduit 207A (FIG. 1A) is shown at a shorter height than conduit 207B, which is telescoped to a desired height. Taller conduits can possibly provide needed clearance for cables and tubing so that they don't interfere with the operation of a system in which they are embedded. Tubing/cabling 213 (FIG. 1B) can be routed outside of conduit 207B (FIG. 1B) for a variety of reasons. Outside routing can take advantage of, for example, the telescoping features of the snorkel of the present teachings without having to be threaded through the conduit. Outside routing can also enable some cables/tubing to be routed in a different direction from other cables/tubing. Cap 205A (FIG. 1C) and cap 205B (FIG. 1D) are shown be rotated to a different orientations. To enable directing cables/tubing to preferred locations without rerouting the cables/tubes, cap 205A (FIG. 1C) can be rotated, and can be secured in its new position by any suitable method.

Figure 2A:
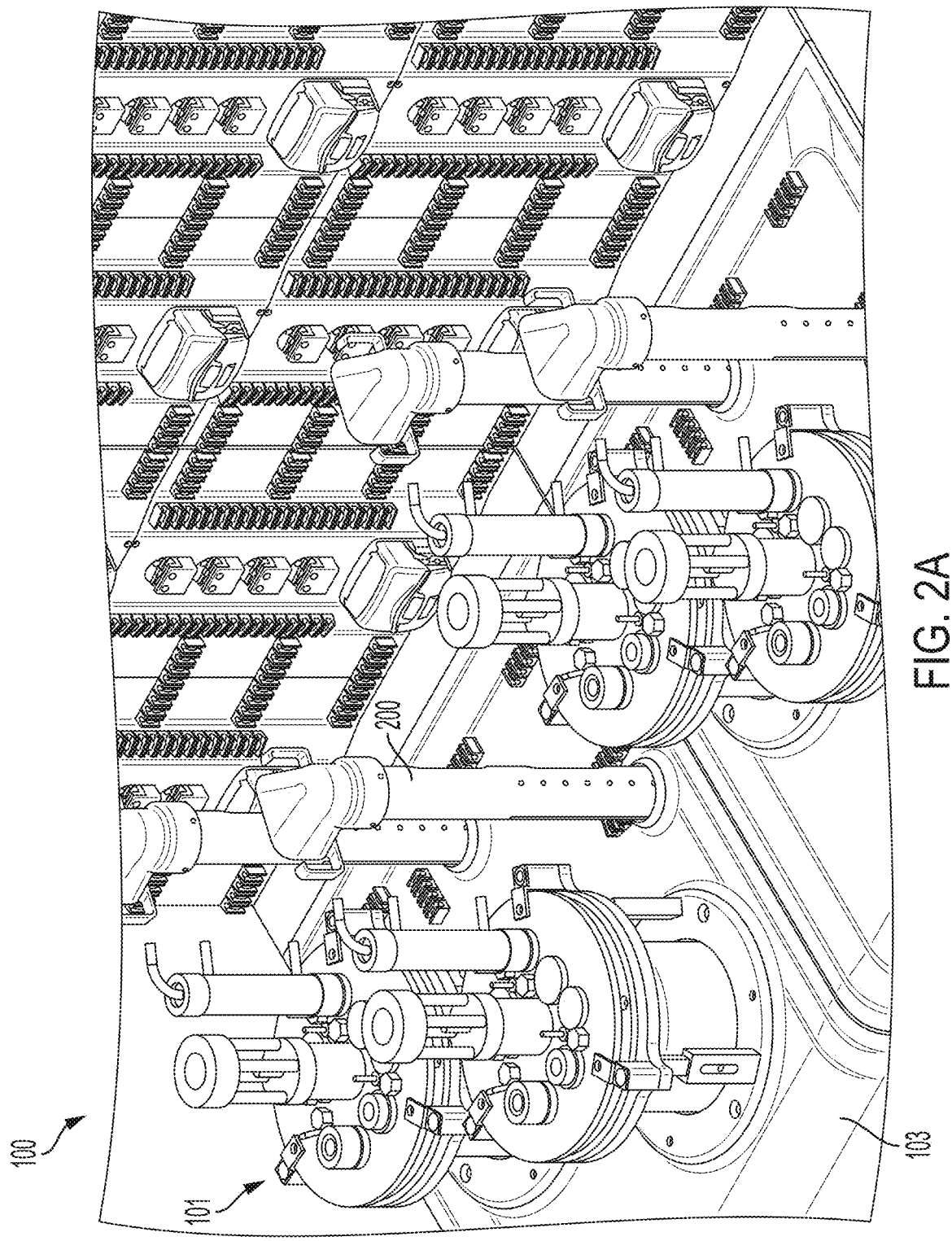
FIG. 2A is a perspective view of an environment in which the snorkel of the present teachings can be used.
Figure 2B:
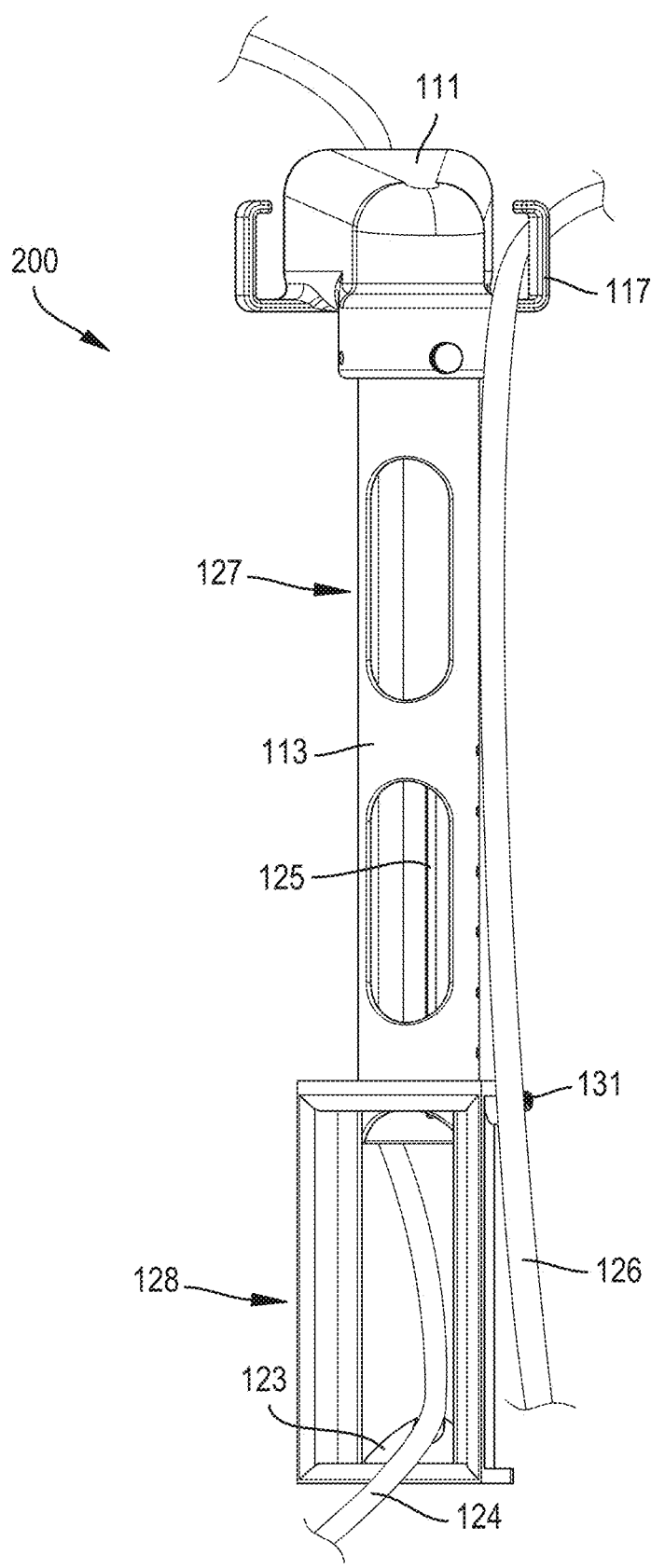
FIG. 2B is a perspective view of the snorkel of the present teachings including exemplary tubing and cabling.

Referring now to FIG. 2A, culture vessel station 100, a system for expanding and harvesting cells, is a configuration in which sleeve/snorkel 200 can be useful. Culture vessel station 100 can include a compact configuration that can include four culture vessels 101, for example. All fluid delivered to and from each culture vessel 101 is through assemblies of sterilized disposable tubing. Each culture vessel station 100 can be configured with a different vessel size, fluid path, and sensing capabilities based on the requirements of the cell growth process. In some configurations, sterilized closed tubing sets can include weldable and sealable tubing that can deliver fluid to and from other system components. Culture vessel station 100 can include, for example, media supply tubing that can provide media from a media reservoir to culture vessels 101. The media supply line can be installed in chassis 103, can extend to a fluid handling system of culture vessel station 100, and can ultimately extend to culture vessels 101 through sleeve/snorkel 200 of the present teachings. The media supply line can remain in place until cell expansion and/or harvest is complete for culture vessel station 100. Culture vessel station 100 can include, for example, a disposable recirculation line that can provide a sterile fluid path from culture vessel 101 through a sensor block and back to culture vessel 101. The recirculation line can remain in place until cell expansion and/or harvest is complete for culture vessel station 100. Culture vessel station 100 can include, for example, a disposable culture vessel output line that can provide a sterile fluid path to support several purposes downstream of culture vessel 101. The output line of culture vessel 101 can be left in place until cell expansion and/or harvest is complete for culture vessel station 100. This fluid path can tie culture vessel 101 to peripheral equipment for cell harvest, for transfer to another culture vessel station 100, and to send media to a waste containment system, for example. Culture vessel station 100 can include, for example, a disposable seed line that can provide a sterile fluid pathway from an upstream location to culture vessel 101. The seed line can be left in place until cell expansion and/or harvest is complete for culture vessel station 100. The exemplary lines described herein can be guided to culture vessel 101 (FIG. 2A) by sleeve/snorkel 200 to enable tubing/wiring organization and equipment diversification. For example, culture vessel 101 can be sourced based on the ultimate goals of a project. Further, the numbers and types of tubes and wires that culture vessel 101 requires can vary across different types of culture vessels 101. Sleeve/snorkel 200 can be adjusted in height and orientation to accommodate the needs of various culture vessels 101.

Referring now to FIGS. 2B-4, an exemplary configuration of the snorkel of the present teachings is shown in various orientations of sleeve/snorkel 200 to illustrate features of the device. Sleeve/snorkel 200 can include snorkel cap 111, cable snorkel conduit 113, and snorkel base 115. Snorkel cap 111 can include cable exit cavity 130, tubing guide ears 117, and conduit interface 121. Conduit interface 121 can enable rotation of snorkel cap 111 a pre-determined amount with respect to cable snorkel conduit 113. The rotation can position wires and tubes accommodated by sleeve/snorkel 200 to locate them for convenient connection to culture vessel 101 (FIG. 2A), while minimizing spare cable and tubing that can require space. Tubing guide ears 117 can guide fluid tubes and cables 126, examples of which are described herein, to operably couple with, for example, culture vessel 101 (FIG. 2A).

Continuing to refer to FIGS. 2B-4, the common opening shared by snorkel base 115, cable snorkel conduit 113, and snorkel cap 111 can accommodate power/data cables or tubing 124, for example. Power/data cable(s) or tubing 124 can be threaded through base opening 128 in snorkel base 115, for example, but not limited to, manually, to enable tooless reconfiguration. The geometry of snorkel base 115 can enable cable(s) and tubes 124 to travel through base opening 128 without encountering sharp edges and bends. Base opening 128 can include cable guide 123 that can gently encourage cable(s) 124 to bend to enter the conduit opening. Cable guide 123 can be oriented at a pre-selected angle 133 (FIG. 3) to enable a non-kink bend. In some configurations, pre-selected angle 133 (FIG. 3) can vary depending upon the bend radius of cable(s) and/or tubing 124. Optional divot 171 can enable space for a tooled or toolless attachment of snorkel base 115 to a mounting surface.

Figure 4:
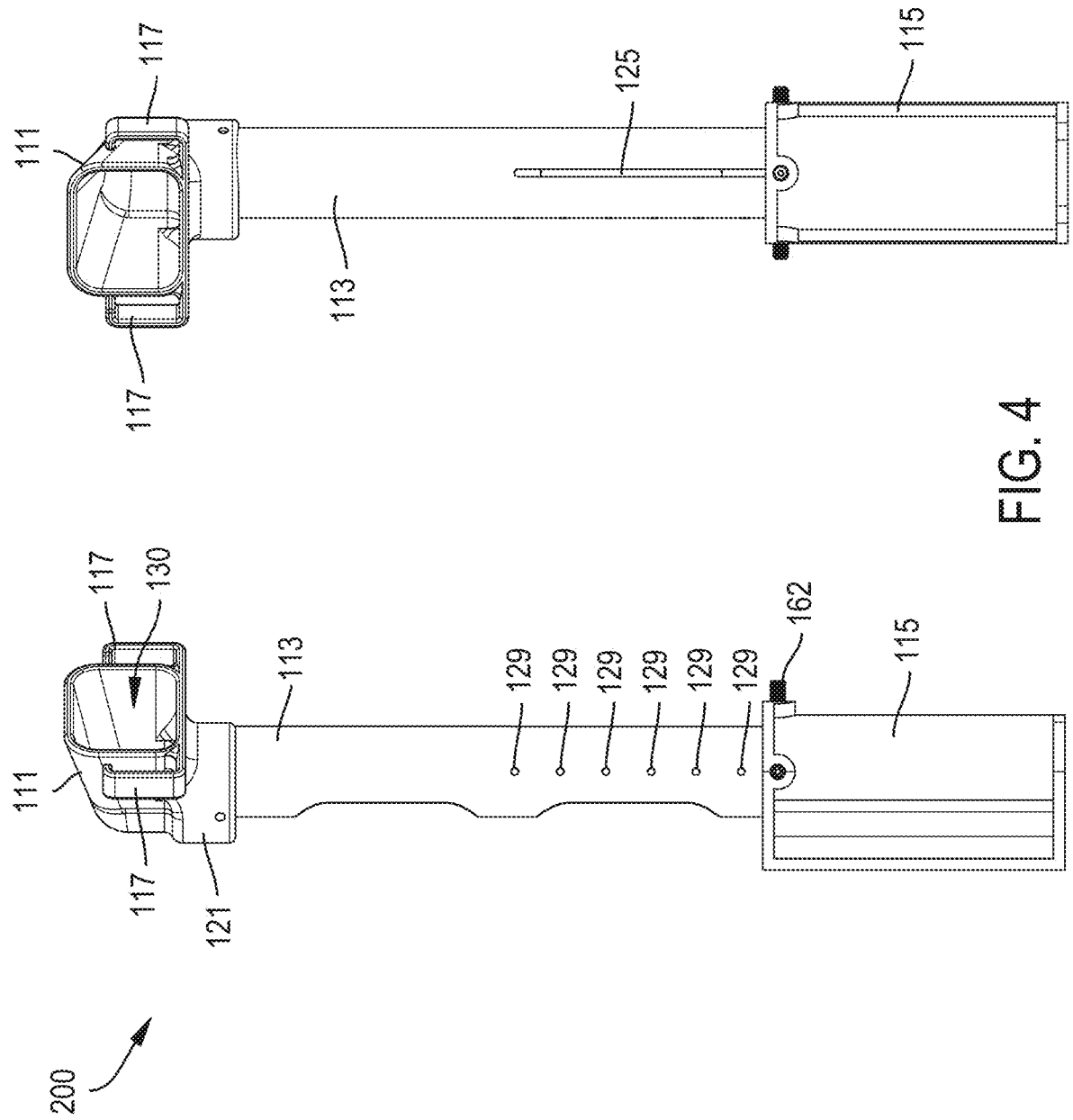
Figure 5:
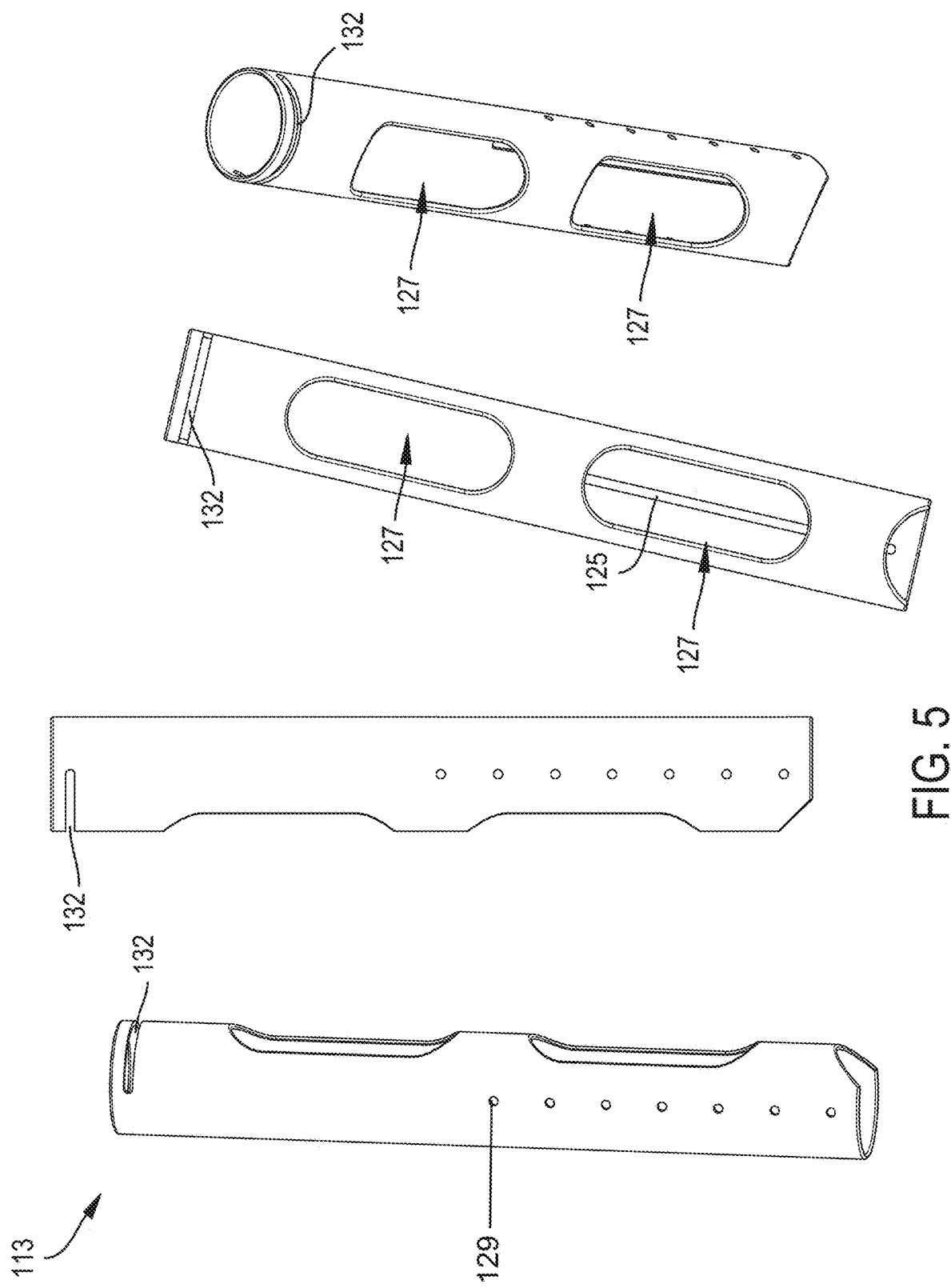
FIG. 5 is a set of perspective views of the cable snorkel conduit of the present teachings.

Referring now to FIG. 5, snorkel base 115 (FIG. 4) can be operably coupled with cable snorkel conduit 113. As cable(s) and tubing 124 (FIG. 2B) travel through base cavity 128 (FIG. 2B), they can enter cable snorkel conduit 113 on their way to snorkel cap 111 (FIG. 4). In some configurations, cable snorkel conduit 113 can be 1.5 inches outside diameter, but the size can vary based on available space in the system and the size of the tubing and cables required to be accommodated. Cable snorkel conduit 113 can include conduit cavities 127, rotation slit 132, detents 129 (FIG. 4), and alignment cut 125. Conduit cavities 127 can be used to assist in threading cable(s) and tubing 124 through cable snorkel conduit 113, into snorkel cap 111 to exit sleeve/snorkel 200 through cap cavity 130 (FIG. 4). In some configurations, conduit cavities 127 can be sized to fit one or more human fingers, for example. There can be one or more conduit cavities 127, depending at least upon the length of cable snorkel conduit 113. Rotation slit 132 can allow snorkel cap 111 to rotate with respect to cable snorkel conduit 113. Rotation slit 132 can extend a pre-selected amount around the circumference of cable snorkel conduit 113. In some configurations, rotation slit 132 can enable a 180° rotation of snorkel cap 111 with respect to cable snorkel conduit 113, but any rotation angle size is possible. Snorkel cap 111 can include plunger cavity 138 that can accept pull pin 152 that, when engaged with rotation slit 132, can enable the rotation of snorkel cap 111 while maintaining positional stability guided by rotation slit 132. Rotation slit 132 and any pin that might interface with rotation slit 132 can be any width compatible with mechanical integrity of cable snorkel conduit 113.

Continuing to refer to FIG. 5, at least one detent 129 can enable the telescoping feature of sleeve/snorkel 200. By raising and lowering cable snorkel conduit 113 with respect to snorkel base 115 (FIG. 4), various-sized interfacing devices can be accommodated. Relatively short/tall devices can be accommodated by lowering/raising cable snorkel conduit 113. Lowering and raising cable snorkel conduit 113 can be accomplished by applying enough force to dislodge conduit spring plungers 131 from at least one detent 129 (FIG. 4), and moving cable snorkel conduit 113 to one of the heights coincident with one of at least one detent 129 (FIG. 4). Cable snorkel conduit 113 can include as many of at least one detent 129 (FIG. 4) as desired, compatible with the mechanical integrity of cable snorkel conduit 113. At least one detent 129 (FIG. 4) and associated conduit spring plungers 131 can be any diameter, compatible with the mechanical integrity of cable snorkel conduit 113. Alignment cut 125 can be any width and length, compatible with the mechanical integrity of cable snorkel conduit 113.

Figure 6:
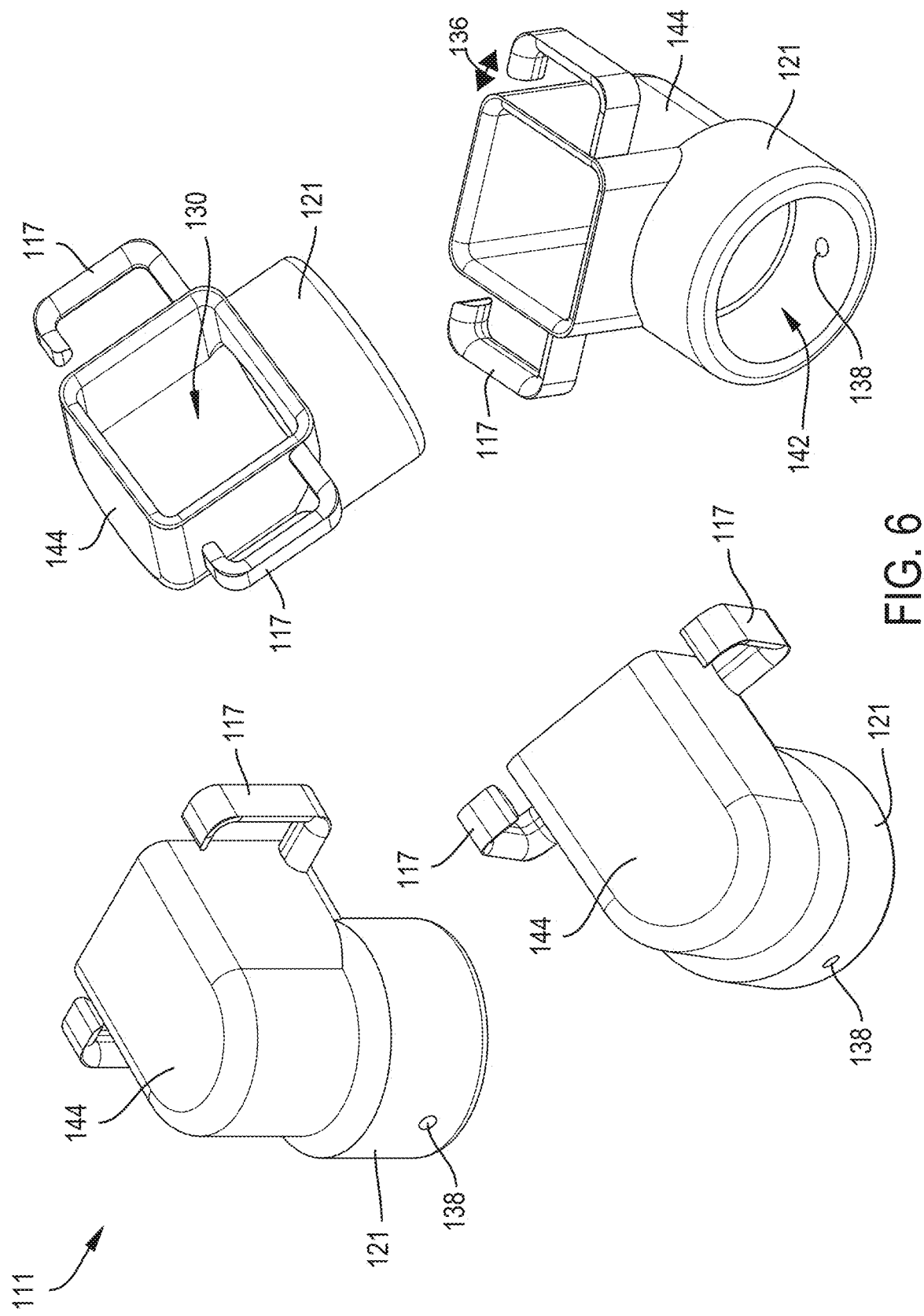
FIG. 6 is a set of perspective views of the snorkel cap of the present teachings.

Referring now to FIG. 6, snorkel cap 111 can include rotation cavity 138, conduit interface 121, tubing guide ear(s) 117, ear gap 136, exit housing 144, and exit cavity 130. Conduit interface 121 can include conduit interface cavity 142 that can be sized to slidably engage with cable snorkel conduit 113, and can include rotation cavity 138. Rotation cavity 138 can accommodate a pin that can engage with rotation slit 132 (FIG. 5) to position conduit interface cavity 142 upon cable snorkel conduit 113. Tube(s) and/or cable(s) 126 can be guided to their ultimate coupling destination(s) by tubing guide ear(s) 117. Sleeve/snorkel 200 (FIG. 2B) can include one or more tubing guide ear(s) 117, depending upon the number of tube(s) 126 that are to be accommodated in the system. Tube(s) 126 can be positioned alongside cable snorkel conduit 113 before entering, and exit housing 144 before exiting, tubing guide ear(s) 117. Tubing guide ear(s) 117 can receive tube(s) 126 that can proceed, for example, along the outer shell of sleeve/snorkel 200. Tubing guide ear(s) 117 can be sized to accommodate a wide range of tube sizes and numbers of tubes. Optional ear gap 136 can provide a space between tubing guide ear(s) 117 and exit housing 144. Ear gap 136 can enable placing tube(s) 126 within tubing guide ear(s) 117 without having to thread the length of tube(s) 126 through tubing guide ear(s) 117. Ear gap 136 can be any size consistent with the desired diameter of tube(s) 126 and the mechanical integrity of exit housing 144 and tubing guide ear(s) 117. Tubing guide ear(s) 117 can be any shape and size, again, depending upon the needs of the system. In some configurations, tube(s) 126 can be sized at 5/32 inch. In some configurations, tubing guide ear(s) 117 can accommodate up to four tubes 126.

Continuing to refer to FIG. 6, exit housing 144 can surround exit cavity 130 that can provide a location for cable(s) 124 to exit sleeve/snorkel 200 and be available for operable coupling with a device in the system. Exit cavity 130, and therefor exit housing 144, can take any shape and size that can accommodate at least one cable 124. In some configurations, a rectangular shape for exit housing 144 can provide, but is not necessary to provide, a relatively flat mounting surface for tubing guide ear(s) 117.

Figure 7:
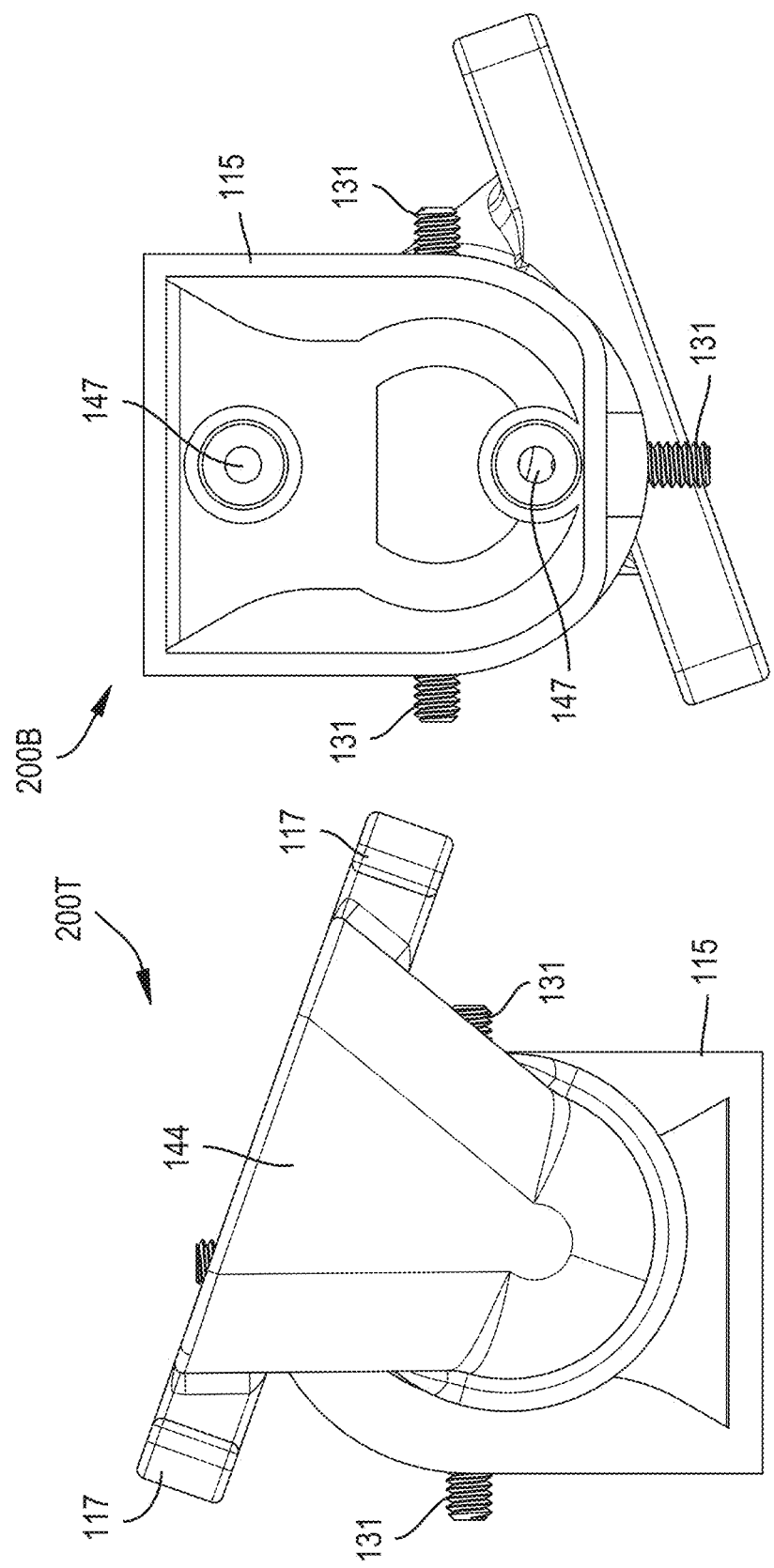
FIG. 7 presents a top view and a bottom view of the snorkel of the present teachings.

Referring now to FIG. 7, top view 200T of sleeve/snorkel 200 illustrates exit housing 144 rotated with respect to cable snorkel conduit 113. Bottom view 200B of sleeve/snorkel 200 illustrates at least one mounting cavity 147 that can be used to couple sleeve/snorkel 200 (FIG. 2B) with a hosting system platform. Secure mounting can advantageously stabilize sleeve/snorkel within the hosting system.

Figure 8:
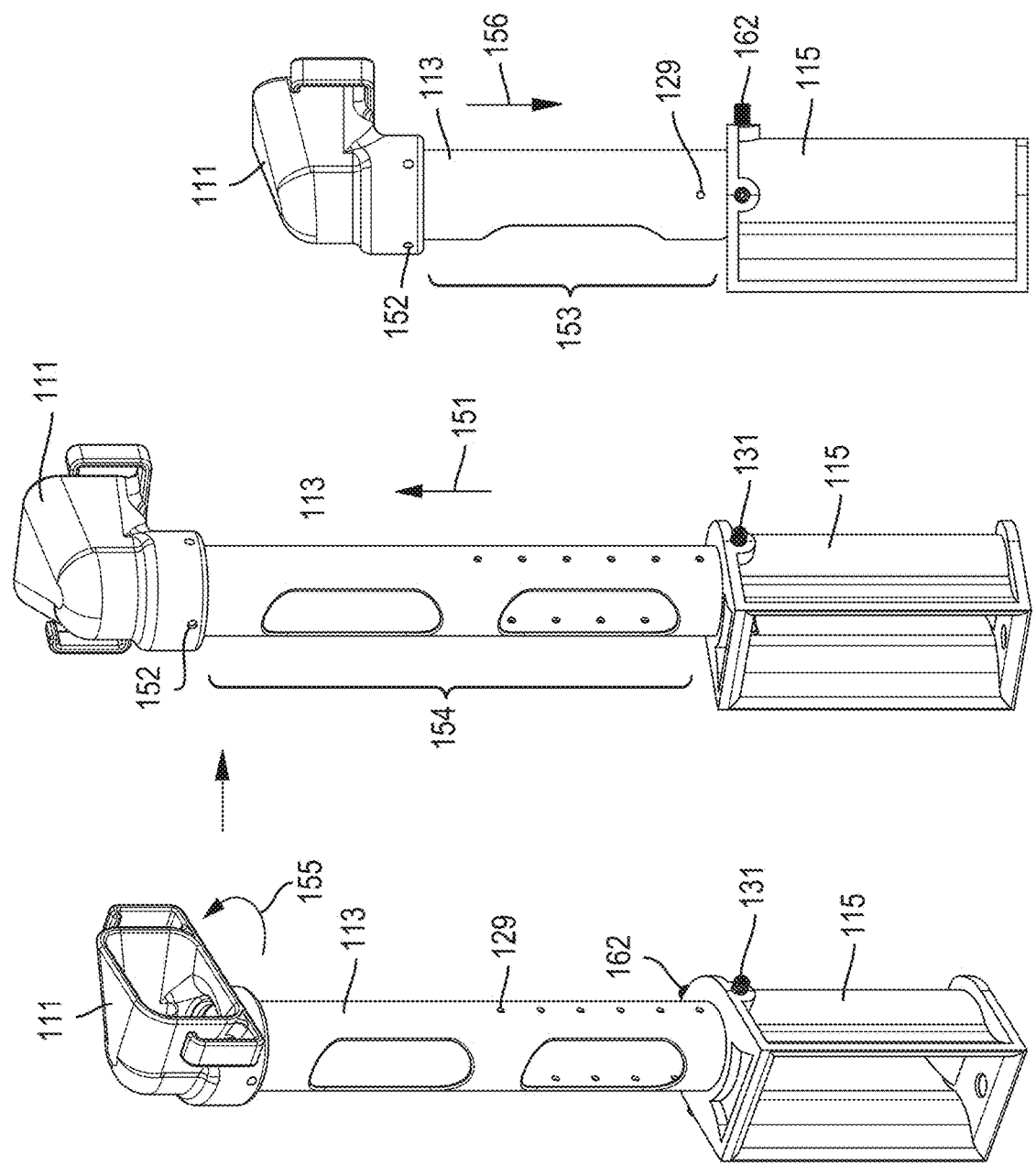
FIG. 8 presents the snorkel cap of the present teachings at various rotations and at various heights.

Referring now to FIG. 8, detents 129 and ball plungers 131 can enable lengthening and shortening cable snorkel conduit 113. Ball plungers 131 can hold cable snorkel conduit 113 at a desired height, and can also allow toolless pressure adjustment of the height. In some configurations, ball plungers 131 can include stainless steel high torque ball nose spring plungers, for example, but not limited to, MCMASTER-CARR® spring plungers https://www.mcmaster.com/5901A34/. Spring plunger 162 can interface with alignment cut 125 (FIG. 4) to maintain detents 129 in alignment with cavities accepting ball plungers 131. In some configurations, spring plunger 162 can include a high torque long nose stainless steel spring plunger, for example, but not limited to, MCMASTER-CARR® long nose spring plunger https://www.mcmaster.com/8476A38/. Together, ball plungers 131, detents 129, spring plunger 162, and alignment cut can enable extension 151 of cable snorkel conduit 113 to a relatively tall height 154, and retraction 156 to a relatively short height 153, and several lengths in between. Detents 129 can be spaced any desired amount, and there can be any number of detents 129, limited to maintain the structural integrity of cable snorkel conduit 113. Snorkel cap 111 can be rotated by rotation amount 155, limited only by the circumferential size of rotation slit 132. Pull pin 152 can enable snorkel cap 111 to securely rest upon cable snorkel conduit 113 before, during, and after rotation amount 155. In some configurations, pull pin 152 can include a knob-style retractable spring plunger, for example, but not limited to, MCMASTER-CARR® stainless steel knob-style retractable spring plunger https://www.mcmaster.com/8692A11-8692A111/.

Various alternatives and modifications can be devised by those skilled in the art without departing from the disclosure. Accordingly, the present disclosure is intended to embrace all such alternatives, modifications and variances. Additionally, while several example configurations of the present disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular configurations. In addition, those skilled in the art will envision other modifications within the scope and spirit of the claims appended hereto. Other elements, steps, methods and techniques that are insubstantially different from those described above and/or in the appended claims are also intended to be within the scope of the disclosure.

The drawings are presented only to demonstrate certain examples of the disclosure. In addition, the drawings described are only illustrative and are non-limiting. In the drawings, for illustrative purposes, the size of some of the elements may be exaggerated and not drawn to a particular scale. Additionally, elements shown within the drawings that have the same numbers may be identical elements or may be similar elements, depending on the context.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B.

Furthermore, the terms "first", "second", "third," and the like, whether used in the description or in the claims, are provided for distinguishing between similar elements and not necessarily for describing a sequential or chronological order. It is to be understood that the terms so used are interchangeable under appropriate circumstances (unless clearly disclosed otherwise) and that the example configurations of the disclosure described herein are capable of operation in other sequences and/or arrangements than are described or illustrated herein.

The invention claimed is:

1. A snorkel for guiding cables and tubes comprising:
   a base having an entrance, at least one alignment cut cavity, and a conduit interface, the entrance configured to guide cabling into the conduit interface;
   a conduit operably coupled with the base, the conduit including a cap interface, the conduit receiving the cabling through the conduit interface, the conduit configured to enable raising/lowering of the conduit; and
   a cap operably coupled with the conduit, the cap including a cable exit cavity and at least one tubing guide ear, the cap receiving the cabling through the cap interface, the cap configured to guide the cabling through the cable exit cavity, the at least one tubing guide ear configured to guide tubing alongside the cable exit cavity.

2. The snorkel as in claim 1 wherein the base further comprises:
   a cable ramp configured to accommodate a cable bend radius of the cabling.

3. The snorkel as in claim 1 wherein the base further comprises:
   at least one base mounting cavity.

4. The snorkel as in claim 1 wherein the base further comprises:
   at least one detent cavity.

5. The snorkel as in claim 4 wherein each of the at least one detent cavity being configured to accommodate a ball plunger configured to secure a position of the conduit after the raising/lowering.

6. The snorkel as in claim 4 wherein the conduit further comprises:
   at least one detent configured to enable the raising/lowering of the conduit, the at least one detent configured to align with the at least one detent cavity.

7. The snorkel as in claim 6 wherein the conduit further comprises:
   at least one alignment cut configured to maintain alignment of the at least one detent with the at least one detent cavity.

8. The snorkel as in claim 1 wherein the at least one alignment cut cavity being configured to accommodate a spring plunger configured to position the conduit during the raising/lowering.

9. The snorkel as in claim 1 wherein the conduit further comprises:
   at least one threading cavity configured to enable threading of the cabling to the cap interface.

10. The snorkel as in claim 1 wherein the conduit further comprises:
    at least one rotation slit enabling rotation of the cap with respect to the conduit.

11. The snorkel as in claim 10 wherein the cap further comprises:
    at least one rotation cavity configured to receive a pin, the pin entering the at least one rotation slit through the at least one rotation cavity.

12. The snorkel as in claim 1 wherein the at least one tubing guide ear comprises:
    a first portion operably coupled with the cap, the first portion extending substantially perpendicular to the cap;
    a second portion operably coupled with the first portion, the second portion extending substantially perpendicular to the first portion; and
    a third portion operably coupled with the second portion, the third portion extending substantially perpendicular to the second portion, the third portion being separated from the cap by a gap.

* * * * *